Feb. 24, 1942.　　　　I. WOLFF　　　　2,274,262

AIR SPEED INDICATOR

Filed May 31, 1939

Inventor
Irving Wolff
By
Attorney

Patented Feb. 24, 1942

2,274,262

UNITED STATES PATENT OFFICE 2,274,262

AIR SPEED INDICATOR

Irving Wolff, Merchantville, N. J., assignor to Radio Corporation of America, a corporation of Delaware Application May 31, 1939, Serial No. 276,691

7 Claims. (Cl. 73—194)

This invention relates to air speed indicators and particularly to a device for measuring the velocity of air irrespective of the pressure of the medium.

One of the devices used for measuring the velocity of an aircraft, with respect to the medium in which it is operated, is a Pitot tube. A system of this type measures the velocity of the plane with respect to the air but the measurement depends upon the atmospheric pressure at the time and place of taking the observation. The error due to the effect of atmospheric pressure causes the readings to be lower than the actual air speed when the plane is operating at high altitudes or under conditions of low atmospheric pressure. A correction chart may be used but the time consumed in making the corrections and the necessity of determining the atmospheric pressure makes the Pitot tube system for indicating air velocities impractical for certain observations.

One of the objects of the present invention is to provide means for indicating the velocity of air independently of the atmospheric pressure. Another object is to provide means for indicating the velocity of a craft with respect to the medium in which it is operating. A further object is to indicate the velocity of a craft with respect to the medium in which it is operating and to apply automatically corrections to compensate for changes in temperature of the medium. A still further object is to indicate the velocity of an aircraft with respect to air and independently of the temperature and pressure of the air.

Figure 1:
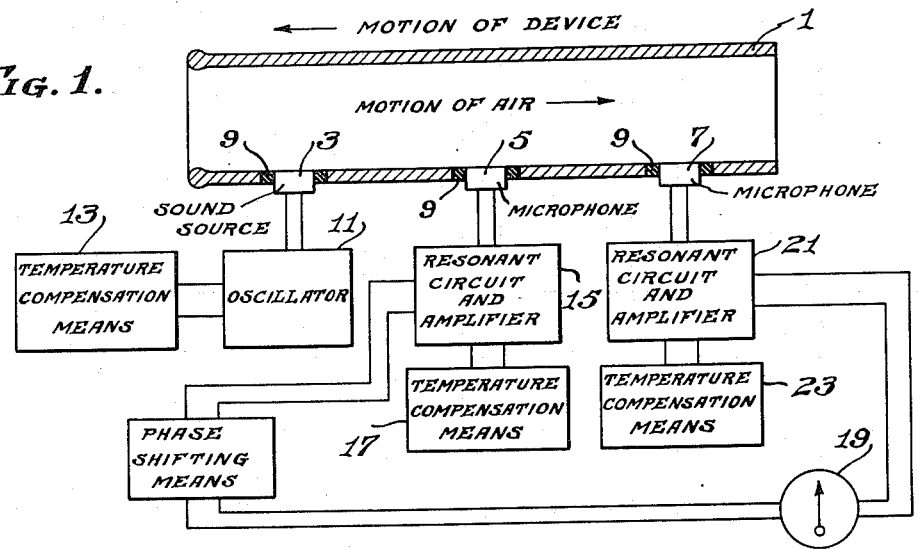
Figure 2:
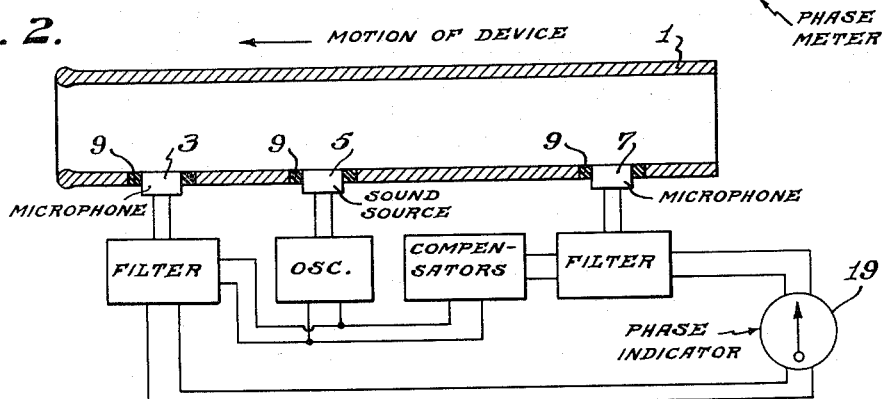
Figure 3:
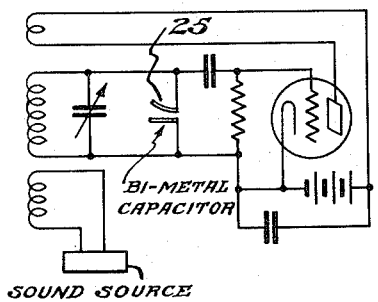
Figure 4:
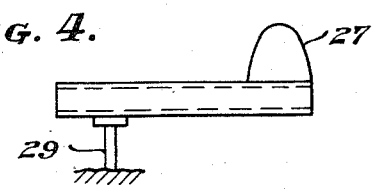
Figure 5:
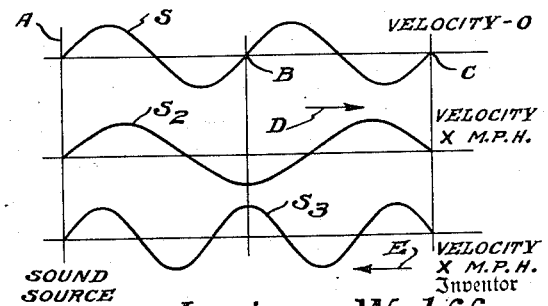

The invention will be described by referring to the accompanying drawing, in which Figure 1 represents one embodiment of the invention; Figure 2 is a modification shown in schematic form; Figure 3 is a circuit diagram of a temperature compensated oscillator; Figure 4 is an elevational view of an element of the invention applied to the measurement of air velocities; and Figure 5 is a schematic diagram used in explaining the invention. Similar reference numerals will be used to indicate similar parts in the several figures.

Referring to Figure 5, if a sound is emitted at the point A it will travel through the ambient medium. The sound may be represented as a sine wave S. One wave length of the sound is shown between A and B. A second wave length is shown between B and C. If the velocity of the medium is zero the wave length will equal the velocity of sound propagation divided by the frequency of the sound. If the medium is moving with a velocity X miles per hour in the direction indicated by the arrow D the the wave length will be changed as indicated by the curve $S_2$. It will be seen that the phase of the wave $S_2$ is no longer the same at the points B and C but a phase displacement has occurred due to the lengthening of the wave length as a function of velocity.

On the other hand, in the event that the medium is moving in the direction indicated by the arrow E with respect to the source of sound, the wave length will be shortened and the phase displacement at the points B and C on the wave $S_3$ will be altered compared with the original phase on the curve S.

This principle is used to measure the velocity of the air by means of the arrangement of the preferred embodiment of the invention shown in Fig. 1. Within a hollow member 1, which may be suitably streamlined, are arranged a sound source 3 and a pair of microphones 5, 7. The microphones are preferably mounted in sound absorbing gaskets 9. Their spacing is determined by the velocity range to be covered, the type of phase meter to be used, and the frequency of the sound source, and may be determined by using the principles to be now explained. Let us suppose the velocities to be determined lie between $nc$ and $mc$ where $n$ and $m$ are constants and $c$ is the velocity of sound. The wave lengths as measured along the axis of the device with respect to which the medium waves are $$\frac{(1+n)c}{f} \text{ and } \frac{(1+m)c}{f}$$

where $f$=frequency. Two pickup devices spaced a distance $d$ apart will record a difference in phase of $$\frac{360df}{(1+n)c} \text{ and } \frac{360df}{(1+m)c}$$

degrees respectively and the change in this phase difference in going from velocity $nc$ to $mc$ will be $$360\left[\frac{df(m-n)}{c(1+mn+m+n)}\right] \text{ degrees}$$

If $\lambda$ is the wave length in the medium at rest, this can be written $$360\frac{d}{\lambda}\left[\frac{m-n}{1+mn+m+n}\right] \text{ degrees}$$

As an illustration, take $m=.4$, $n=.2$ (range from about 150–300 miles per hour) and assume we are using a phase meter that can cover a range of 180°

$$360\frac{d}{\lambda}\left[\frac{.2}{1.68}\right]=180$$

$$\frac{d}{\lambda}=4.2$$

If the range desired were 0 to 300 miles per hour, $n=0$ $$360\frac{d}{\lambda}\left[\frac{.4}{1.4}\right]=180$$

$$\frac{d}{\lambda}=1.7$$

With fixed spacing, the frequency can be chosen to give maximum sensitivity over the range desired and vice versa. To change the range with fixed spacing, a frequency change can be made.

If the phase meter is of such type that it reads certain phase ranges more readily such as 0–180°, means for obtaining the desired phase displacement can be added in one of the microphone circuits or some sensitivity can be sacrificed to make this adjustment. The spacing of the first microphone from the source is not critical and can be adjusted for convenience in construction and good sound pickup.

The sound source is energized by an oscillator 11 which may include temperature compensation means 13. The oscillator and the desirability of temperature compensation therefor will be discussed hereinafter. The first microphone 5 is connected through a resonant circuit which may include an amplifier 15. The resonant circuit may also include temperature compensation means 17. The output of the resonant circuit or amplifier is connected to a phase meter 19. One suitable type of phase indicator is disclosed in copending application Serial No. 203,358, filed April 21, 1938, by Irving Wolff for a "Method and means for indicating phase."

The second microphone 7 is connected to a resonant circuit 21 and amplifier, if desired. The second resonant circuit may also include temperature compensation means 23. The output of the second resonant circuit is applied to the phase meter 19.

In the operation of the device the oscillator is adjusted to generate currents of a suitable frequency which may be compensated for variations in temperature as hereinafter explained. These currents actuate a diaphragm in the sound source 3 from which sound waves of the desired frequency or wave length are established. The microphones respond to the sound waves and generate currents which may be filtered from any disturbing noises by the resonant circuit 15. In the event that compensation is used in the oscillator, it is also desirable to apply the compensation to the resonant circuit so that it will remain tuned to the oscillator. The second microphone and resonant circuit generate a similar current. These two currents are applied to the phase meter. The velocity of the air, as has already been described, will cause the phase to change and thereby indicate the speed of the craft carrying the device with respect to the medium in which it is operating.

It has been found that the velocity of sound is substantially independent of the pressure in the region of normal atmospheric pressures and that the velocity of sound is a function of the temperature of the medium in which the sound is propagated. The effect of the temperature on the velocity is indicated by the following formula:

$$C_t=1047\sqrt{1+0.002207\theta-0.415\theta^2 10^{-7}}$$

where $C_t$ is the velocity of sound in feet per second at any temperature,
1047 is the velocity of sound in feet per second in air, and
$\theta$ is the temperature in degrees Fahrenheit.

If the frequency of the generator is automatically varied as a function of temperature, substantially perfect compensation for the effects of temperature on the velocity may be had for the normal velocities which are to be measured.

The amount of correction required can be determined by the following analysis. Assume that the apparatus has been correctly adjusted for temperature T where the velocity of sound is $c$. It is to be used at a temperature T' where the velocity is $c'$. Call $$\frac{c'}{c}=t$$

The range of velocity to be covered is as before $$nc=\frac{nc'}{t} \text{ to } mc=\frac{mc'}{t}$$

Using the same spacing $d$ we compute the frequencies $f'_n$ and $f'_m$ required to give the same phase difference between pickups for velocity of sound $c'$ as was obtained with frequency $f$ for velocity $c$.

$$\frac{360df'_n}{\left(1+\frac{n}{t}\right)c'}=\frac{360df}{(1+n)c} \text{ and } \frac{360df'_m}{\left(1+\frac{m}{t}\right)c'}=\frac{360df}{(1+m)c}$$

$$\frac{f'_n}{f}=\frac{t+n}{1+n} \quad \frac{f'_m}{f}=\frac{t+m}{1+m}$$

Although the correction required is different for $m$ than for $n$, this difference will in all present practical cases be small. To illustrate, we follow the previous example of $n=.2$ $m=.4$ and take $t=1.10$ which corresponds approximately to a temperature difference of 100° F. Substituting these values $$f'_n=1.08 \quad f'_m=1.07$$

By compensating for the average of these values, the error would be only .5 percent at either extreme of the range. The correction may be made by shunting a bimetal capacitor 25 across the resonant circuit of the oscillator as shown in Fig. 3.

Instead of placing the microphone or sound pickup devices on the same side of the sound source, as shown in Fig. 1, the first microphone may be placed to the left of the sound source and the second microphone to the right of the sound source, as shown in Fig. 2.

If this arrangement of microphones is used, it is preferable to space the microphone in the direction of motion closer to the source than the other so as to obtain approximately equal phase shift on each one. Covering the velocity range from $nc$ to $mc$, the ratio of spacings should be $$\frac{1-\frac{m+n}{2}}{1+\frac{m+n}{2}}$$

approximately.

The device is not limited to the measurement of the velocities of air as it may be employed in measuring the velocity in any sound transmitting medium. If the invention is used to measure the velocity of a vessel in water, it is desirable to space the microphones several wave lengths from the sound source and several wave lengths from each other. It is also desirable to use supersonic frequencies in water because of the higher velocity of sound in a liquid medium.

If the invention is employed in the measurement of air velocities with respect to a stationary point on the earth's surface, the tube carrying the device may be mounted with the vane 27 at the rear in a pivotal support 29, as shown in Fig. 4. By means of the pivot and the vane, the axis of the tube is maintained substantially parallel to the movement of air through the tube.

Thus the invention has been described as a device for measuring the velocity of a medium or the velocity of a craft with respect to a medium. Sound waves are emitted by a sound source whose frequency is maintained substantially constant or whose frequency may be varied to compensate for the effect of temperature changes on the velocity of sound. The wave length varies as a function of velocity of the medium and therefore the phase of the emitted wave varies with respect to fixed points at which suitable phase indicating means are connected. It should be understood that any acoustic sound source may be used in place of the electronic generator and diaphragm shown.

I claim as my invention:

1. A device for indicating velocity including a source of sound waves, a pair of pickup devices responsive to said sound waves, means effectively connected to said pickup devices for indicating the velocity of the medium passing said source and said devices as a function of the phase of said sound waves, and means for changing the frequency of said sound as a function of temperature of the medium to thereby indicate the velocity within limits independent of said temperature.

2. A device for indicating velocity including a source of sound waves, a pair of microphones located at fixed points with respect to said sound waves and along the path of the medium whose velocity is to be measured, means connected to said microphones for measuring the phase of said waves and thereby indicate the velocity of the medium, and means for changing the frequency of said sound as a function of temperature of the medium to thereby indicate the velocity within limits independent of said temperature.

3. A velocity indicator including a sound wave source, a pair of sound pickups located along the path of the medium whose velocity is to be measured and selectively responsive to said sound wave, means including a phase indicator connected effectively to said sound pickups to indicate the velocity of said medium as a function of the phase of the sound wave at said pickups, and means for varying the frequency of said source by an amount compensating for the effect of temperature on the velocity of sound.

4. The method of measuring the velocity of motion of a medium, which includes emitting a sound wave of a predetermined frequency, altering said frequency to compensate for the effect of the temperature of said medium on the velocity of sound, receiving said sound wave at points parallel to said motion, and measuring the velocity of said medium as a function of the phase difference of said sound wave at said points of reception.

5. The method of indicating the velocity of a sound wave medium, which includes emitting a sound wave of predetermined frequency, varying said frequency to compensate substantially for the effect of temperature changes in said medium, selectively receiving said sound wave at points along the line of movement of said medium, changing said selection to correspond with said compensated frequency, and measuring the velocity of said medium as the phase difference of the wave at said points of reception.

6. The method of measuring the velocity of motion of a medium which includes emitting a sound wave of a predetermined frequency, altering said frequency to compensate for the effective temperature of said medium on the velocity of sound, receiving said sound wave at points parallel to said motion and measuring the velocity of said medium as a function of the phase difference of said sound wave received at said points of reception.

7. A velocity indicator including a sound wave source, a pair of sound pickups located along the path of the medium whose velocity is to be measured and selectively responsive to said sound wave, means including a phase indicator connected effectively to said sound pickups to indicate the velocity of said medium as a function of the phase of the sound wave at said pickups, and means effectively connected to the wave source for compensating for the effects of the temperature on the velocity of sound within said medium, and means effectively connected between said sound pickups and said phase indicator for altering the selective response to said sound wave.

IRVING WOLFF.